United States Patent [19]

Johnson

[11] Patent Number: 4,526,050

[45] Date of Patent: Jul. 2, 1985

[54] SELF-TENSIONING DIFFERENTIAL CAPSTAN CABLE DRIVE MECHANISM

[75] Inventor: Robert A. Johnson, Tempe, Ariz.

[73] Assignee: Motorola, Inc., Schaumburg, Ill.

[21] Appl. No.: 336,816

[22] Filed: Jan. 4, 1982

[51] Int. Cl.³ .................. F16H 27/02; F16H 29/02; G05G 1/08

[52] U.S. Cl. .................. 74/89.22; 74/89.2; 74/96; 74/506

[58] Field of Search ............ 74/506, 10.7, 89.21, 74/89.2, 89.22, 96; 254/332; 242/158 R

[56] References Cited

U.S. PATENT DOCUMENTS

| | | | |
|---|---|---|---|
| 2,224,193 | 12/1940 | Mahnken | 74/230.18 |
| 2,764,894 | 10/1956 | Faxen | 74/89.2 |
| 2,828,635 | 4/1958 | Johnson et al. | 74/95 |
| 2,859,629 | 11/1958 | Parker et al. | 74/89.22 |
| 3,183,737 | 5/1965 | Matz | 74/506 |
| 3,203,270 | 8/1965 | Booth | 74/517 |
| 3,491,603 | 1/1970 | Harris | 74/89.22 |
| 3,872,960 | 3/1975 | Gabor | 197/53 |

FOREIGN PATENT DOCUMENTS 2226908  12/1972  Fed. Rep. of Germany ....... 74/89.2

*Primary Examiner*—Leslie A. Braun
*Attorney, Agent, or Firm*—Lowell W. Gresham

[57] ABSTRACT

A self-tensioning differential capstan cable drive mechanism having canted rollers on either side of the differential capstan around each of which rollers is looped a cable passing from the larger to the smaller drum of the differential capstan.

6 Claims, 1 Drawing Figure

U.S. Patent     Jul. 2, 1985     4,526,050
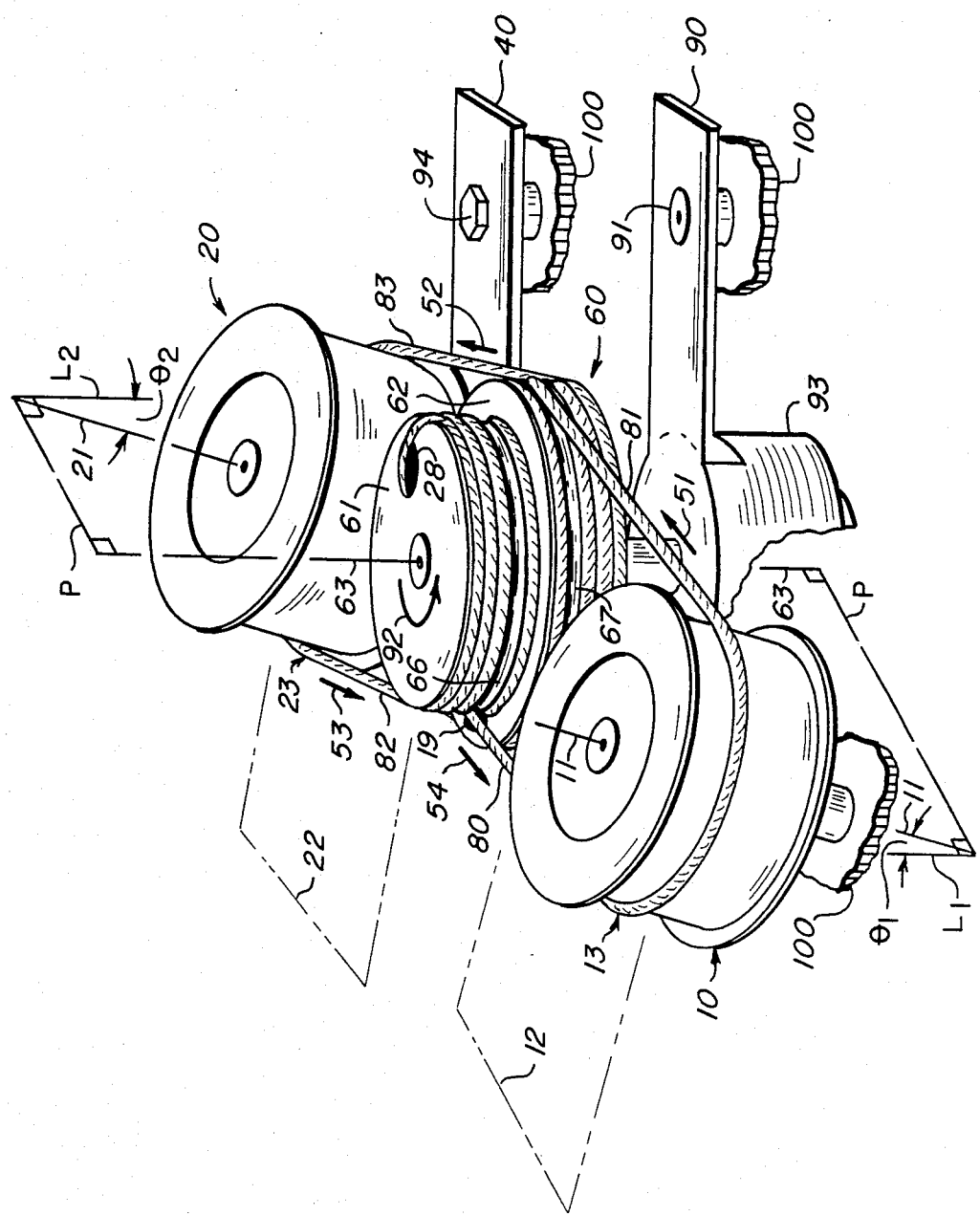

SELF-TENSIONING DIFFERENTIAL CAPSTAN CABLE DRIVE MECHANISM

BACKGROUND OF THE INVENTION

The present invention relates to differential capstan cable drive mechanisms and more particularly to self-tensioning differential capstan cable drive mechanisms.

Differential capstan cable drive mechanisms provide motion and relatively large mechanical advantage for reciprocating linear movement or oscillation of a member about a pivot point. Some differential capstan cable drive systems comprise a cable having an end fixed to the small drum of a differential capstan, a first portion passing between the small drum and a pulley, a second portion passing through the groove of the pulley, a third portion passing between the pulley and the large drum of the capstan, and a second end fixed to the large drum of the capstan. Other differential capstan cable drive mechanisms involve the use of an endless cable that is looped around the small drum of a differential capstan, passed through the groove of a pulley and passed back to loop around the large drum of the differential capstan before passing through the groove of a second pulley, opposite the first, and returning to form the loop around the small drum of the differential capstan. Both of these approaches are illustrated in U.S. Pat. No. 2,859,629.

In both of the above-described approaches uniform tension is maintained on the cable by passing the cable through the groove of an additional resiliently mounted pulley. This resiliently mounted pulley takes up slack resulting from oscillation of the member in response to rotation of the differential capstan in opposite directions and in this way limits backlash. In addition, because a pulley is a wheel having a groove around its circumference for narrowly limiting cable travel, where a fixed pulley is used the position of the portion of a cable at the point in the groove of a pulley farthest from the differential capstan is fixed. Therefore, the distance between this farthest point and the point on the capstan at which the cable is winding or unwinding changes as the hypotenuse of a triangle the remaining sides of which are formed by a line to the point in the capstan directly opposite the farthest point on the pulley and by a line from the opposite point of the point of winding or unwinding. This represents a geometrical source of slack which can be compensated for by the use of a resiliently mounted pulley as shown in the above-cited patent.

However, in operations such as a servo loop for obtaining precisely reproducible displacement of an oscillating member upon application of known amounts of torque to the capstan in either direction, the use of a resiliently mounted member imposes a factor proportional to the spring rate of the resilient material times the displacement upon the return of the capstan leading to variable torque. Nevertheless, in order to precisely control the position of the oscillating member, it is essential to control backlash to avoid over correction by the servo loop and the resulting undesirable jittering motion.

SUMMARY OF THE INVENTION

Accordingly it is an object of the present invention to provide an improved differential capstan cable drive mechanism.

It is a further object of the present invention to provide a new and improved differential capstan cable drive mechanism capable of self-tensioning without the introduction of resiliently mounted tensioning devices.

Among the advantages of the present invention is the ability to be used in space-limited applications.

These and other objects and advantages of the present invention will become apparent to those skilled in the art upon consideration of the accompanying specification, claims and drawings.

In order to attain the above mentioned and other objects and advantages, the present invention comprises a differential capstan having a relatively large drum and a relatively small drum, a first roller and a second roller positioned adjacent opposite sides of said differential capstan, a first cable passing from the small drum around the first roller and back to the large drum, and a second cable passing from the small drum around a second roller and back to the large drum. The portions of the first cable passing to and from the differential capstan define a plane as do the portions of the second cable passing to and from the differential capstan and the axis of rotation of the first roller is approximately normal to the plane defined by the first cable portions, the rotational axis of the second roller is normal to the plan defined by the portions of the second cable, and the rotational axes of both rollers are canted with respect to the rotational axis of the differential capstan.

BRIEF DESCRIPTION OF THE DRAWINGS

The FIGURE is a perspective view of a preferred embodiment of the present invention.

DESCRIPTION OF THE PREFERRED EMBODIMENT

In a preferred embodiment of the differential capstan cable drive mechanism of the present invention as shown in the figure, a differential capstan 60 comprises a cylindrical drum 61 having a relatively smaller diameter coaxially connected to cylindrical drum 62 having a relatively larger diameter. The cylindrical surfaces of drum 61 and 62 are furrowed by helical grooves 66 and 67 respectively. Differential capstan 60 is connected to the drive shaft of motor 93 which is in turn connected to an oscillating member 90. Oscillating member 90 is rotatably connected to a structure 100 by a pivot 91. Two cylindrical rollers 10 and 20 are disposed on opposite sides of differential capstan 60 and both are connected to structure 100.

A first cable 13 is connected to drum 61 at the end of the cylindrical surface of drum 61 closest to drum 62. From that point, cable 13 is wound upward through groove 66 before passing away from differential capstan 60 and around roller 10. Cable 13 then passes to drum 62 where it winds upward through groove 67 to a terminus 19 on the edge of the cylindrical surface of drum 62 closest to drum 61 where it is attached by means well known to one skilled in the art. A cable 23, attached at a terminus 28 on the upper most edge of the cylindrical surface of drum 61, is wound downward through groove 66 before passing around roller 20 and back to drum 62. Cable 23 is wound through groove 67 downward until it reaches a point on the edge of the cylindrical surface of drum 62 farthest from drum 61 where it is attached by means well known to one skilled in the art.

Cable 13 can be considered to comprise a first relatively straight portion 80 and second relatively straight portion 81 which, if considered as approximations of straight lines, geometrically define a plane 12 in which both straight portions lie. Likewise, cable 23 can be considered to comprise relatively straight portions 82 and 83 which also approximate straight lines which can be geometrically considered to define a plane 22.

Roller 10 is rotatably connected to surface 100. Roller 20 is rotatably connected to an arm 40 which is in turn releasably fastened by a bolt 94 to surface 100. By loosening fastening 94 on arm 40, roller 20 is moveable toward or away from differential capstan 60 for establishment or adjustment of the initial tension on cables 13 and 23.

Roller 10 has an axis of rotation 11, roller 20 has an axis of rotation 21, and differential capstan 60 has an axis of rotation 63. Axes 11 and 21 are canted with respect to axis 63 by angles $\theta_1$ and $\theta_2$, respectively as shown in the figure wherein lines $L_1$ and $L_2$ are parallel to axis 63 in a plane P. Angles $\theta_1$ and $\theta_2$ are chosen so that throughout most of the operating range of the differential capstan cable drive mechanism axis 11 is approximately normal to plane 12 and axis 21 is approximately normal to plane 22. Canting rollers 10 and 20 in this way prevents the backlash and binding that would otherwise occur if axes 11 and 21 were parallel to axis 63.

In the operation of the present invention as shown in the figure, rotation of differential capstan 60 about axis 63 in a direction 92 results in relatively less cable being unwound in direction 54 from drum 61 then is wound in direction 51 on to drum 62 due to the difference in diameter of the two drums. Likewise, during the same rotation, more cable is unwound in direction 52 from drum 62 then is wound on drum 61 in direction 53 due to the difference in diameter of the two drums. Therefore, the net effect of the rotation of differential capstan 60 in direction 92 is to decrease the distance between capstan 60 and roller 10 and to increase the distance between capstan 60 and roller 20. Because oscillating member 90 is connected to capstan 60 through motor 93, it is rotated about pivot point 91 toward roller 10 by the same rotation. It is clear that any rotation in the opposite direction would cause capstan 60 to move toward roller 20 so that member 90 would pivot toward roller 20. It is obvious to one skilled in the art that the rotation of capstan 60 can be controlled by a connecting motor 93 in a servo loop with a mechanism for sensing the position of member 90 so that member 90 can be returned to a desired position relative to rollers 10 and 20 after displacement by an external force by rotation of capstan 60 in the appropriate direction.

The present invention has several advantages over prior art systems. In the preferred embodiment as shown in the figure the force applied to oscillating member 90 is the same for either direction of rotation of capstan 60, as opposed to prior art systems having a spring return, so that oscillation of member 90 can be more precise as controlled using the present invention. In prior art systems having dual fixed pulleys, the position of the cables on the sides of the pulleys farthest from the capstan is fixed while the position of the portions of the cables closest to the capstan rises and falls as the capstan turns in either direction so that slack is created in the cables which must be corrected by spring tensioning to avoid backlash. In the present invention spring tensioning is not needed because the portions of the cables farthest from the capstan are free to move vertically on rollers 10 and 20 to follow the portions of the cables winding on and unwinding from the capstan so that slack is not created.

Although the present invention has been described in terms of a preferred embodiment further modifications and improvements will occur to those skilled in the art. For example, in the preferred embodiment of the present invention as depicted in the figure the portions of cable 23 which are wrapped around drums 61 and 62 are positioned distally, that is toward respective ends of the differential capstan, with respect to the portions of cable 13 which are wrapped around drums 61 and 62 by allowing one cable to be wound within one turn of a groove while the other cable is wound in the next turn. This configuration minimizes the height of the differential capstan as is desirable in applications in which space saving is an important feature. However, a staggered configuration is also possible wherein, for example, the portion of cable 13 which is wrapped around drum 61 is located distally with respect to the portion of cable 23 which is wrapped around drum 61, while the portion of cable 23 which is wrapped around drum 62 is located distally with respect to the portion of cable 13 which is wrapped around drum 62. I desire it to be understood, therefore, that this invention is not limited to the particular form shown and I intend in the appended claims to cover all such equivalent variations which come within the scope of the invention as described.

I claim:

1. A differential capstan cable drive mechanism for movement of an oscillating member rotatably mounted on a fixed structure comprising:

a differential capstan affixed to the oscillating member for movement therewith, said capstan having an axis of rotation, having a first drum with a relatively larger diameter, and having a second drum with a relatively smaller diameter;

a first roller mounted on the structure and having an axis of rotation;

a second roller mounted on the structure and having an axis of rotation;

a first cable having a first end connected to said first drum, having a portion wrapped around said first drum, having a portion looped around said first roller, having a portion wrapped around said second drum, and having an end connected to said second drum; and a second cable having an end connected to said second drum, having a portion wrapped around said second drum, having a portion looped around said second roller, having a portion wrapped around said first drum, and having an end connected to said first drum.

2. The differential capstan cable drive mechanism as recited in claim 1 wherein said axis of rotation of said first roller is canted with respect to said axis of rotation of said differential capstan and said axis of rotation of said second roller is canted with respect to said axis of rotation of said differential capstan.

3. The differential capstan cable drive mechanism as recited in claim 1 wherein said portions of said first cable wound about said first and said second drum of said differential capstan are disposed distally with respect to said portions of said second cable wound about said first drum and about said second drum.

4. The differential capstan cable drive mechanism as recited in claim 1 wherein each of said first and second rollers has an axial length at least as great as the maximum axial distance the portion of said first cable looped around said first roller and the portion of said second cable looped around said second roller can move during winding and unwinding of said first and second cables on the first and second drums of said differential capstan to provide free axial movement of said first and second cable loops.

5. The differential capstan cable drive mechanism as recited in claim 1 wherein one of said first and second rollers is releasably mounted on the structure and further including tensioning means associated with said one of said first and second rollers for providing a desired amount of tension in said first and second cables.

6. A differential capstan cable drive mechanism for movement of an oscillating member rotatably mounted on a fixed structure comprising:
- a differential capstan being rotatably connected to the oscillating member, having an axis of rotation, having a first drum with a relatively larger diameter, and having a second drum with a relatively smaller diameter;
- a first roller being rotatably connected to the structure and having an axis of rotation canted with respect to said axis of rotation of said differential capstan;
- a second roller being rotatably connected to the structure and having an axis of rotation canted with respect to said axis of rotation of said differential capstan;
- a first cable having an end connected to said first drum, having a portion wound around said first drum, having a portion looped around said first roller, having a portion wound around said second drum, and having a second end connected to said second drum; and
- a second cable having a first end connected to said second drum, having a portion wrapped around said second drum, having a portion looped around said second roller, having a portion wrapped around said first drum, said portions of said second cable wrapped around said first and said second drums being disposed distally with respect to said portions of said first cable wrapped around said first and said second drum.

* * * * *